United States Patent
Nilsson et al.

(10) Patent No.: US 11,159,713 B2
(45) Date of Patent: Oct. 26, 2021

(54) IMAGING SYSTEM AND METHOD OF PRODUCING IMAGES

(71) Applicant: Varjo Technologies Oy, Helsinki (FI)

(72) Inventors: Anna Nilsson, Tuusula (FI); Ville Timonen, Espoo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/599,328

(22) Filed: Oct. 11, 2019

(65) Prior Publication Data
US 2021/0112192 A1    Apr. 15, 2021

(51) Int. Cl.
*G06T 11/00* (2006.01)
*G09G 5/12* (2006.01)
*H04N 5/232* (2006.01)

(52) U.S. Cl.
CPC ......... *H04N 5/23218* (2018.08); *G06T 11/00* (2013.01); *H04N 5/232125* (2018.08)

(58) Field of Classification Search
CPC ....................................................... G06T 11/00
USPC .......................................................... 345/633
See application file for complete search history.

(56) References Cited

U.S. PATENT DOCUMENTS

| | | | |
|---|---|---|---|
| 2005/0289193 A1* | 12/2005 | Arrouye | G06F 16/134 |
| 2015/0312468 A1* | 10/2015 | Taylor | H04N 5/23299 |
| | | | 348/47 |
| 2016/0167672 A1* | 6/2016 | Krueger | A61B 5/4863 |
| | | | 340/576 |
| 2016/0224657 A1* | 8/2016 | Mullins | G06F 16/951 |
| 2017/0243373 A1* | 8/2017 | Bevensee | G01S 17/08 |
| 2017/0264890 A1* | 9/2017 | Gorilovsky | B66B 13/303 |
| 2017/0358141 A1* | 12/2017 | Stafford | A63F 13/537 |
| 2020/0036955 A1* | 1/2020 | Pesonen | H04N 13/111 |

* cited by examiner

*Primary Examiner* — Javid A Amini
(74) *Attorney, Agent, or Firm* — Ziegler IP Law Group, LLC (57) ABSTRACT

An imaging system for producing images for a display apparatus, the imaging system including: at least one camera; means for tracking an orientation of the at least one camera; and at least one processor communicably coupled to said camera and said means. The at least one processor is configured to: create and store an N-dimensional data structure representative of an environment; for a plurality of orientations of the at least one camera, determine values of camera attributes to be employed to capture a given image from a given orientation and update the N-dimensional data structure with the determined values; access the N-dimensional data structure to find values of camera attributes for a current orientation; and control the at least one camera to employ the found values for capturing an image of real-world scene from the current orientation.

18 Claims, 2 Drawing Sheets

IMAGING SYSTEM AND METHOD OF PRODUCING IMAGES

TECHNICAL FIELD

The present disclosure relates generally to imaging systems; and more specifically, to imaging systems for producing images for display apparatuses. Moreover, the present disclosure relates to methods of producing images for display apparatuses.

BACKGROUND

In recent times, there have been exponential advancements in development and use of technologies such as augmented reality, mixed reality and so forth, for presenting a simulated environment to a user. Specifically, such technologies provide the user with a feeling of complete involvement (namely, immersion) within the simulated environment. Such simulated environments often relate to real world environments including simulated objects therein (namely, augmented reality environments, mixed reality environments, and the like). For simulated environments wherein real and virtual worlds are combined together, an image of the real world is captured by way of camera(s) and presented to the user by way of specialized devices. Notably, a quality of the captured image depends upon properties of the camera(s). Examples of camera properties include, but are not limited to: focus, white-balance, and exposure.

Presently, values of the camera properties are often adjusted dynamically based on a quality of a captured image. For example, at an instance when oversaturation is detected in the captured image, shutter speed and/or sensitivity is reduced iteratively until a required saturation level is achieved. However, such iterative change in values of the camera properties takes a considerable amount of time for example, such as, 1 second. Alternatively, when changing the values of the camera properties is done in a smaller amount of time for example, 100 millisecond, exposure levels vary rapidly and a visible oscillation in brightness is observed in the captured image until the brightness stabilizes to a certain value. Notably, the camera(s) is/are required to iteratively set the values of the camera properties and assess the quality of the captured image. As described above, determining required values for the camera properties by iteration consume a lot of time and computational effort. Furthermore, existing iterative approaches of determining the required values for the camera properties adversely affects the quality of the captured image. This reduces user's experience of immersion in the simulated environment.

Therefore, in light of the foregoing discussion, there exists a need to overcome the aforementioned drawbacks associated with producing images for display apparatuses.

SUMMARY

The present disclosure seeks to provide an imaging system for producing images for a display apparatus. The present disclosure also seeks to provide a method of producing images for a display apparatus. The present disclosure seeks to provide a solution to the existing problem of complex, time consuming adjustment of camera properties of cameras employed for capturing images of an environment. An aim of the present disclosure is to provide a solution that overcomes at least partially the problems encountered in prior art, by providing an imaging system and a method of producing images for a display apparatus that allow for adjusting values of the plurality of camera attributes in a simple, accurate, and time-efficient manner.

In one aspect, an embodiment of the present disclosure provides an imaging system for producing images for a display apparatus, the imaging system comprising:
at least one camera;
means for tracking an orientation of the at least one camera; and
at least one processor communicably coupled to the at least one camera and said means, wherein the at least one processor is configured to:
  create and store an N-dimensional data structure representative of an environment to be presented to a user;
  for a plurality of orientations of the at least one camera within the environment, determine values of a plurality of camera attributes to be employed to capture a given image of a given real-world scene from a given orientation of the at least one camera within the environment and update the N-dimensional data structure with the determined values of the plurality of camera attributes for the given orientation of the at least one camera within the environment;
  access the N-dimensional data structure to find values of the plurality of camera attributes for a current orientation of the at least one camera within the environment; and
  control the at least one camera to employ the found values of the plurality of camera attributes for capturing an image of a real-world scene from the current orientation of the at least one camera within the environment.

In another aspect, an embodiment of the present disclosure provides a method of producing images for a display apparatus, the method comprising:
creating and storing an N-dimensional data structure representative of an environment to be presented to a user;
tracking an orientation of at least one camera within the environment;
for a plurality of orientations of the at least one camera within the environment, determining values of a plurality of camera attributes to be employed to capture a given image of a given real-world scene from a given orientation of the at least one camera within the environment and updating the N-dimensional data structure with the determined values of the plurality of camera attributes for the given orientation of the at least one camera within the environment;
accessing the N-dimensional data structure to find values of the plurality of camera attributes for a current orientation of the at least one camera within the environment; and
controlling the at least one camera to employ the found values of the plurality of camera attributes for capturing an image of a real-world scene from the current orientation of the at least one camera within the environment.

Embodiments of the present disclosure substantially eliminate or at least partially address the aforementioned problems in the prior art, and enable adjustment of the plurality of camera attributes associated with the at least one camera time-efficiently according to the current orientation of the at least one camera.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system for producing images for a display apparatus, the imaging system comprising:
at least one camera;
means for tracking an orientation of the at least one camera; and
at least one processor communicably coupled to the at least one camera and said means, wherein the at least one processor is configured to:
  create and store an N-dimensional data structure representative of an environment to be presented to a user;
  for a plurality of orientations of the at least one camera within the environment, determine values of a plurality of camera attributes to be employed to capture a given image of a given real-world scene from a given orientation of the at least one camera within the environment and update the N-dimensional data structure with the determined values of the plurality of camera attributes for the given orientation of the at least one camera within the environment;
  access the N-dimensional data structure to find values of the plurality of camera attributes for a current orientation of the at least one camera within the environment; and
  control the at least one camera to employ the found values of the plurality of camera attributes for capturing an image of a real-world scene from the current orientation of the at least one camera within the environment.

In another aspect, an embodiment of the present disclosure provides a method of producing images for a display apparatus, the method comprising:
  creating and storing an N-dimensional data structure representative of an environment to be presented to a user;
  tracking an orientation of at least one camera within the environment;
  for a plurality of orientations of the at least one camera within the environment, determining values of a plurality of camera attributes to be employed to capture a given image of a given real-world scene from a given orientation of the at least one camera within the environment and updating the N-dimensional data structure with the determined values of the plurality of camera attributes for the given orientation of the at least one camera within the environment;
  accessing the N-dimensional data structure to find values of the plurality of camera attributes for a current orientation of the at least one camera within the environment; and
  controlling the at least one camera to employ the found values of the plurality of camera attributes for capturing an image of a real-world scene from the current orientation of the at least one camera within the environment.

The present disclosure provides the aforementioned imaging system and the aforementioned method. The images produced by the imaging system have high quality and are realistic since the imaging system determines values of the plurality of camera attributes to be employed for capturing said images based upon orientation of the at least one camera. Notably, such an approach of determining said values reduces a computation time and effort required therefor. Beneficially, said values are determined in real time or near-real time, and therefore the adjustment of the plurality of camera attributes occurs in real time or near-real time. As a result, changes in captured images are imperceptible to the user. When the user is presented the produced image of the real-world scene of the environment, the user experiences considerable realism and immersion within the produced image. Therefore, the user's experience of viewing the real-world scene is enhanced.

Throughout the present disclosure, the term "imaging system" refers to an equipment configured to produce images for the display apparatus. It will be appreciated that the imaging system produces the images in real time or near real time.

Throughout the present disclosure, the term "display apparatus" refers to a specialized equipment that is configured to present an environment to a user when the display apparatus in operation is worn by the user on his/her head. In such an instance, the display apparatus acts as a device (for example, such as an augmented reality headset, a pair of augmented reality glasses, a mixed-reality headset, a pair of mixed-reality glasses, and the like) that is operable to present a visual scene of an environment (for example, such as an augmented-reality environment, a mixed-reality environment, and the like) to the user. The display apparatus may also commonly be referred to as "head-mounted display apparatus".

The imaging system is at least communicably coupled to the display apparatus. By way of such communicable coupling, the imaging system transmits the produced images to the display apparatus. In some implementations, the imaging system is integrated with the display apparatus. In such implementations, the imaging system is physically coupled to the display apparatus (for example, attached via mechanical and electrical connections to components of the display apparatus). In other implementations, the imaging system is implemented on a remote device that is separate from the display apparatus. In such implementations, the imaging system and the display apparatus are communicably coupled via a wired communication interface or a wireless communication interface. Optionally, the imaging system is mounted on the remote device. Examples of the remote device include, but are not limited to, a drone, a vehicle, and a robot. In such an instance, the remote device is physically positioned at a given real-world environment, whereas the user of the display apparatus is positioned away from (for example, at a distance from) the remote device.

Throughout the present disclosure, the term "camera" refers to equipment that is operable to detect and process light from the environment, so as to capture the given image of the given real-world scene. Optionally, the at least one camera comprises a camera chip, wherein the light from the given real-world scene is directed by at least one optical element onto a photosensitive surface of the camera chip, thereby enabling the at least one camera to capture the given image of the given real-world scene. Optionally, the at least one camera is mounted on the remote device.

Optionally, the at least one camera is implemented as at least one of: a Red-Green-Blue (RGB) camera, a RGB-Depth (RGB-D) camera, a stereo camera, a plenoptic camera.

Furthermore, the term "environment" refers to a real-world environment having at least one real object arranged therein. The environment represents a plurality of real-world scenes from the plurality of orientations of the at least one camera within the environment. In an example, the environment may be a living room of a house. The living room may have a bulb in OFF state, an open window, a table and a vase on top of the table. Said environment may represent various scenes from various orientations of the at least one camera, for example, such as a scene X1 representing the table and the vase, a scene X2 representing the bulb, a scene X3 representing the bulb and the open window, and the like.

Throughout the present disclosure, the term "means for tracking the orientation of the at least one camera" refers to specialized equipment for detecting and/or following the orientation of the at least one camera within the environment. Optionally, for tracking the orientation of the at least one camera, the means for tracking the orientation tracks a three-dimensional orientation of at least one of: a camera body, a camera lens.

The means for tracking the orientation of the at least one camera is a true three Degrees of Freedom (3DoF) tracking system. Notably, said means allows for tracking the orientation of the at least one camera in three dimensions. In particular, said means is configured to track rotational movements (namely, roll, pitch and yaw movements) of the at least one camera within a three-dimensional space of the environment. It will be appreciated that use of said means in the imaging system allows for capturing perspective-correct images of real-world scenes in the environment. Such images provide a truly immersive and realistic simulated reality experience to the user.

Optionally, the means for tracking the orientation is coupled to the at least one camera. Alternatively, optionally, said means is not coupled to the at least one camera. Optionally, in this regard, said means is arranged within the environment.

In some implementations, when the imaging system is integrated with the display apparatus, said means can be implemented at the display apparatus as an Inertial Measurement Unit (IMU) or a similar equipment.

In other implementations, said means is an integral part of or is mounted on the remote device on which the at least one camera is mounted. In such implementations, said means can be implemented at the remote device as any one of: an Inertial Measurement Unit, a timing and inertial measurement unit, or a similar equipment.

In yet other implementations, said means is implemented as an external orientation tracking system (namely, an orientation tracking system that is at least partially external to the display apparatus or the remote device on which the at least one camera is mounted). Optionally, the external orientation tracking system is arranged within the environment. Alternatively, optionally, the external orientation tracking system is partially arranged on a device at which the at least one camera is mounted, and is partially arranged within the environment.

Optionally, the external orientation tracking system comprises at least one detector for detecting at least one detectable object. When the at least one detectable object is arranged in the environment, the at least one detector is arranged on the display apparatus or the remote device, and vice versa. In an embodiment, the at least one detectable object is implemented as at least one marker (for example, a Quick Response (QR) code, an ArUco marker, an Radio Frequency Identification (RFID) marker, and the like). The at least one marker is optionally printed on a retroreflective material. It will be appreciated that the at least one detector is selected according to the at least one detectable object. Optionally, the at least one detector is implemented as at least one of: an active infrared (IR) light-emitting diode, an IR camera, an IR transceiver, a visible light-emitting diode, a visible light camera, a laser illuminator, a RFID Reader.

In an exemplary use case, the at least one camera is arranged on the display apparatus. In such a case, multiple QR codes may be printed on retroreflective paper and may be pasted on walls and objects in the environment. Multiple IR light-emitting diodes arranged on a front environment-facing side of the display apparatus are turned on to emit infrared light. IR cameras arranged in proximity of the IR light-emitting diodes capture a bright image of reflections of infrared light from the QR codes. An image processing algorithm detects the QR codes in the captured image, and camera calibration (usually done at a manufacturing facility) is used to determine the orientation of the at least one camera.

Furthermore, the at least one camera and the means for tracking the orientation of the at least one camera are communicably coupled to the at least one processor. Herein, the term "processor" refers to hardware, software, firmware or a combination of these. The at least one processor controls operation of the at least one camera and the means for tracking the orientation. The at least one processor is communicably coupled to the at least one camera and said means wirelessly and/or in a wired manner. It will be appreciated that various components of the imaging system (namely, the at least one camera, said means and the at least one processor) can be implemented at physically separate devices.

The at least one processor creates and stores the N-dimensional data structure representative of the environment to be presented to the user. Optionally, the N-dimensional data structure is created by mapping the environment to an N-dimensional data organization model.

Optionally, when creating the N-dimensional data structure, the at least one processor is configured to:
capture a plurality of images of the environment, via the at least one camera; and
employ at least one image processing algorithm to create the N-dimensional model using the plurality of captured images. By way of capturing the plurality of images of the environment, the at least one camera can be understood to perform a scan of the environment. The at least one image processing algorithm analyzes and/or processes the plurality of images to create the N-dimensional data structure.

Optionally, the N-dimensional data structure is implemented as a two-dimensional data structure. The two-dimensional data structure provides a two-dimensional representation of the plurality of real-world scenes of the environment. Alternatively, optionally, the N-dimensional data structure is implemented as a three-dimensional data structure. The three-dimensional data structure provides a realistic three-dimensional representation of the plurality of real-world scenes of the environment.

Optionally, the at least one image processing algorithm is at least one of: an image stitching algorithm, an image merging algorithm, an interpolation algorithm. Such image processing algorithms are well-known in the art.

Optionally, the two-dimensional data structure is a two-dimensional map. The two-dimensional map comprises nodes that are grouped together to form the at least one real object that is to be represented within the two-dimensional data structure. Data points in the two-dimensional map describe a connected and a continuous field around the imaging system.

Optionally, the three-dimensional data structure is a three-dimensional mesh (for example, such as a three-dimensional textured mesh). Optionally, in this regard, the three-dimensional mesh is a polygonal mesh (for example, such as a three-dimensional mesh whose surface is composed of triangles, or other polygons). In an embodiment, the three-dimensional mesh is generated from a point cloud. In an embodiment, a texture represented in the three-dimensional textured mesh is generated as an image file containing a two-dimensional planar RGB image, wherein the two-dimensional planar RGB image includes values for each pixel of at least one polygon forming the three-dimensional textured mesh, wherein the values are stored at each vertex of the three-dimensional textured mesh.

Alternatively, optionally, the three-dimensional data structure is a volumetric representation of the environment.

Yet, alternatively, optionally, the three-dimensional data structure is represented by way of an octree. Notably, the octree is used to partition the environment by recursively subdividing it into eight octants.

Optionally, the N-dimensional data structure is stored in a memory unit. The memory unit is at least communicably coupled to the at least one processor. Optionally, the imaging system comprises the memory unit. Alternatively, optionally, the display apparatus comprises the memory unit. Yet alternatively, the memory unit is a cloud-based memory unit.

Throughout the present disclosure, the phrase "orientation of the at least one camera" refers to an angle at which the camera body and/or the camera lens of the at the at least one camera is oriented with respect to a reference origin within the environment.

It will be appreciated that when capturing images from different orientations, the at least one camera requires different values for the plurality of camera attributes to be employed to capture the images. The different orientations of the at least one camera allow for capturing different real-world scenes of the environment, and therefore require the different values for the plurality of camera attributes. Herein, the term "camera attribute" refers to a characteristic (namely, a property) of the at least one camera. Examples of the plurality of camera attributes include, but are not limited to: an exposure, an exposure time, a white balance, a focus length, a shutter speed, a sensitivity (namely, an ISO sensitivity), an aperture.

Optionally, the at least one processor determines the values of the plurality of camera attributes for each possible orientation of the at least one camera within the environment. Notably, said values are determined such that the captured given image realistically represents the real-world scene as observed from the given orientation of the at least one camera.

Optionally, the values of the plurality of camera attributes are determined based on a state of the at least one real object within the environment. In an example, the environment may be a bed room having a window, a bed, a table and a glass full of water on top of the table. In such an example, the at least one processor may determine the values of the plurality of camera attributes for different orientations of the at least one camera placed within the bed room. The values of the plurality of camera attributes may be determined such that the at least one camera, when employing the determined values of the plurality of camera attributes to capture the given image of the given real-world scene with the given orientation within the environment, captures a sharp and realistic image of the bed room and/or an object present within the bed room. For example, at a given instance, the at least one processor, determines that low values of the sensitivity of the at least one camera to be employed for capturing the given image of the bed room, when the window is open. When the window is open, natural light sufficiently illuminates the bed room. In such an example, the values of camera attributes are determined based upon an 'open' state of the window within the bed room.

Optionally, when determining the values for the plurality of camera attributes, the at least one processor is configured to analyse the N-dimensional structure representative of the environment. Optionally, in this regard, the at least one processor analyses the N-dimensional structure to determine at least an environmental condition and/or an object attribute of the at least one real object present within the environment. In such a case, the environmental condition may pertain to natural light, precipitation, fluorescence, and the like, present within the environment. Moreover, the object attribute may be a colour, a hue, a tone, a sharpness, a texture, a shape, a size, a geometry, a location, an optical depth, a velocity, and the like, of the at least one real object. The values of the plurality of camera attributes are determined to conform with at least the environmental condition and/or the object attribute of the at least one real object present within the environment.

Furthermore, when the at least one processor updates the N-dimensional data structure with the determined values of the plurality of camera attributes for the given orientation of the at least one camera, the N-dimensional data structure becomes representative of the environment along with the determined values of the camera attributes corresponding to the given orientation of the at least one camera within the N-dimensional data structure. In an example, the N-dimensional data structure may be updated with the determined values of the plurality of camera attributes for 50 orientations of the at least one camera within the environment.

It will be appreciated that the term "at least one camera" encompasses a "single camera" associated with a single user as well as a "plurality of cameras" associated with a plurality of users. Optionally, the N-dimensional data structure is updated with values of a plurality of camera attributes that have been employed for the plurality of cameras associated with the plurality of users. In other words, the N-dimensional data structure is updated via crowdsourcing.

The at least one processor is configured to obtain the current orientation of the at least one camera from the means for tracking the orientation of the at least one camera. Notably, the means for tracking communicates the current orientation of the at least one camera to the at least one processor. The at least one processor accesses the N-dimensional data structure to map the current orientation of the at least one camera with one of the plurality of orientations of the at least one camera that are stored in the N-dimensional structure. The at least one processor fetches the values of the plurality of camera attributes stored in the N-dimensional data structure corresponding to the orientation of the at least one camera that maps to the current orientation of the at least one camera within the environment. Notably, the at least one processor finds values of the plurality of camera attributes for the orientation that substantially maps to (namely, matches) the current orientation of the at least one camera. By finding the values of the plurality of camera attributes using the N-dimensional data structure, a computation burden and time for the at least one processor is considerably reduced.

Furthermore, the at least one processor controls the at least one camera to employ the found values of the plurality of camera attributes for capturing the image of the real-world scene from the current orientation of the at least one camera within the environment. In other words, the at least one processor adjusts current camera attributes to match the found values of the plurality of camera attributes. Such adjustment is made in real time or near-real time, and is imperceptible to the user when the user views the captured image. As a result, the captured image will conform to the current orientation of the at least one camera within the environment. Employing the found values of the plurality of camera attributes allows the at least one camera to capture the image with a correct perspective and represent the real-world scene realistically from a desired view within the environment. In addition, adjusting the plurality of camera attributes allows the at least one camera to optionally capture the image with high clarity.

Optionally, the imaging system further comprises means for tracking a position of the at least one camera, said means being communicably coupled to the at least one processor, wherein, when determining the values of the plurality of camera attributes to be employed, the at least one processor is configured to determine, for a plurality of positions and orientations of the at least one camera within the environment, values of a plurality of camera attributes to be employed to capture a given image of the given real-world scene from a given position and orientation of the at least one camera within the environment and update the N-dimensional data structure with the determined values of the plurality of camera attributes for the given position and orientation of the at least one camera within the environment, wherein, when accessing the N-dimensional data structure, the at least one processor is configured to find values of the plurality of camera attributes for a current position and orientation of the at least one camera within the environment, and wherein, when controlling the at least one camera, the at least one processor is configured to employ the found values of the plurality of camera attributes for capturing an image of the real-world scene from the current position and orientation of the at least one camera within the environment.

Throughout the present disclosure, the term "means for tracking the position of the at least one camera" refers to specialized equipment for detecting and/or tracking the position of the at least one camera within the environment. The means for tracking the position of the at least one camera determines and/or tracks a three-dimensional position of the at least one camera within the environment. The means for tracking the position of the at least one camera is implemented as an optics-based positioning system, an acoustics-based positioning system, a radio-based positioning system, a magnetism-based positioning system, and the like. Such means for tracking the position of the at least one camera are well known in the art.

Optionally, the means for tracking the position is coupled to the at least one camera. Alternatively, optionally, said means is not coupled to the at least one camera. Optionally, in this regard, said means is arranged within the environment.

Optionally, the means for tracking the position and the means for tracking the orientation collectively provide a true six Degrees of Freedom (6DoF) tracking system for the at least one camera. Notably, the means for tracking the position and the means for tracking the orientation allow for tracking the position and the orientation of the at least one camera, respectively, in three dimensions. In particular, the means for tracking the position is configured to track translational movements (namely, surge (forward/backward), heave (up/down), and sway (left/right) movements) of the at least one camera within the three-dimensional space of the environment. It will be appreciated that use of means for tracking the position and the means for tracking the orientation in the imaging system allows for producing pose-correct images for the display apparatus. Such images provide a truly immersive and realistic simulated reality experience to the user.

Optionally, when the imaging system further comprises the means for tracking the position of the at least one camera, the N-dimensional data structure is implemented as the three-dimensional data structure.

It will be appreciated that when values of the plurality of camera attributes to be employed to capture the given image are determined based upon both position and orientation of the at least one camera within the environment, the determined values are highly accurate. Said values are truly indicative of how a user having the same position and the orientation as the at least one camera would view the given real-world scene. When the N-dimensional data structure is updated with such values, the N-dimensional data structure acts as a truly enriched source of the determined values of the plurality of camera attributes for the plurality of positions and orientations of the at least one camera. The values of the plurality of camera attributes for the current position and orientation of the at least one camera (that are found using said N-dimensional data structure) allow for realistically capturing the image of the real-world scene from the current position and orientation of the at least one camera within the environment.

Optionally, the at least one processor is configured to generate from the captured image a mixed-reality image to be presented to the user via the display apparatus, the mixed-reality image being representative of at least one virtual object that is overlaid onto at least one real object present within the given real-world scene, wherein, when determining the values of the plurality of camera attributes to be employed, the at least one processor is configured to adjust, based on a state of the at least one virtual object in the mixed-reality image, the values of the plurality of camera attributes for capturing the given image of the given real-world scene from the given orientation of the at least one camera within the environment.

Throughout the present disclosure, the term "mixed-reality image" refers to an image that represents a combination of the environment with a virtual environment (namely, a computer-generated environment). Optionally, the virtual environment is superposed on (namely, overlaid on) the environment. Furthermore, the mixed-reality image represents a plurality of objects, wherein the plurality of objects comprise the at least one real object and the at least one virtual object. In an example, a mixed-reality image may represent a real object (for example, such as a table) present within the environment and a virtual object (for example, such as a virtual flower vase placed on top of the table).

Optionally, the at least one processor is configured to overlay a virtual image representing the at least one virtual object onto the captured image representing the at least one real object for generating the mixed-reality image. Alternatively, optionally, the at least one processor is configured to overlay the at least one virtual object onto the captured image representing the at least one real object for generating the mixed-reality image.

Optionally, the at least one processor analyses object attributes of the at least one virtual object whilst determining the values of the plurality of camera attributes to be employed. Examples of the object attributes of the at least one virtual object include, but are not limited to: the state of the at least one virtual object, a behavior of the at least one virtual object. Based upon the object attributes of the at least one virtual object, the at least one processor adjusts the values of the plurality of camera attributes so that at least one real object represented in the captured image conforms to the object attributes of the at least one virtual object. This, in turn, allows the mixed-reality image to be optimally generated. Optionally, the state of the object is any one of: on state, off state, open state, closed state, moving state, stationary state, folded state, and the like. In an example, the exposure time of the at least one camera may be reduced to conform to an ON state of a virtual lamp in the given real-world scene, or to an open state of a virtual window. Beneficially, such an adjustment of the values of the plurality of camera attributes allows for a holistic realistic representation of the mixed-reality environment.

Optionally, the steps of updating the N-dimensional data structure with the determined values of the plurality of camera attributes for the plurality of orientations of the at least one camera and accessing the N-dimensional data structure to find the values of the plurality of camera attributes for the current orientation of the at least one camera is performed by one processor, while steps of adjusting the plurality of camera attributes may be performed by another processor.

It will be appreciated that the plurality of camera attributes of the at least one camera are adjusted by way of mechanical adjustments (for example, using actuators to adjust physical components of the at least one camera) and/or digital adjustments (for example, via digital imaging adjustments made by processor(s)).

Optionally, when updating the N-dimensional data structure, the at least one processor is configured to store the determined values of the plurality of camera attributes for the given orientation of the at least one camera within the environment along with information indicative of a state of the environment when the given image was captured, wherein the at least one processor is configured to take into consideration a current state of the environment whilst employing the found values of the plurality of camera attributes for capturing the image of the real-world scene from the current orientation of the at least one camera within the environment.

It will be appreciated that the state of the environment can change with time. Notably, the current state of the environment may or may not be different from the state of the environment which was prevailing at a time when the values of the plurality of camera attributes were determined for the given orientation of the at least one camera. Therefore, when employing the found values of the plurality of camera attributes for capturing the image of the real-world scene from the current orientation of the at least one camera, the found values are required to be adjusted by the at least one processor, based on the current state of the environment. Such adjustment of the values of the plurality of camera attributes allows the at least one camera to capture the image of the real-world scene from the current orientation in a manner that the captured image conforms to the current state of the environment and represents the at least one real object within the environment with required object attributes.

Optionally, the information indicative of the state of the environment is indicative of at least one of: a time of the day (for example, morning, noon, afternoon, evening, and the like), a weather during the time of the day (for example, sunny, cloudy, windy, rainy, snowy, and the like), a type of the environment (namely, an indoor environment or an outdoor environment).

In an example, the information indicative of the state of the environment when the given image was captured may indicate that the weather at the time of capturing the given image was sunny. In such a case, values of shutter speed and sensitivity of the at least one camera at the time of capturing the given image may be determined to be low. When the current state of the environment is sunny, the low values of shutter speed and sensitivity may be employed. Alternatively, when the current state of the environment is cloudy, the low values of shutter speed and sensitivity may be adjusted by increasing said values to capture the image of the real-world scene.

Optionally, when updating the N-dimensional data structure, the at least one processor is configured to store the determined values of the plurality of camera attributes for the given orientation of the at least one camera within the environment along with information indicative of a date and time at which the given image was captured.

Optionally, the information indicative of the date and time at which the given image was captured constitutes a timestamp of the given image.

Optionally, the information indicative of the date and time at which the given image was captured is employed whilst discarding outdated values of the plurality of camera attributes for the given orientation of the at least one camera.

Notably, when the determined values of the plurality of camera attributes for the given orientation belong to a date and time that are prior to a threshold date and time, the determined values are considered to be outdated and are discarded. The at least one processor is optionally configured to delete outdated values of the plurality of camera attributes. It will be appreciated that the at least one processor periodically or intermittently discards outdated values of the plurality of camera attributes for the given orientation of the at least one camera to ensure that the N-dimensional data structure only includes those values of the plurality of camera attributes which pertain to recent date(s) and time(s). The values of the plurality of camera attributes pertaining to the recent date(s) and time(s) are highly likely to be accurate, and are thus preferred whilst finding and employing the values of the plurality of camera attributes for the current orientation of the at least one camera.

Optionally, when the environment has the plurality of users present therein, the plurality of users employ the plurality of cameras to capture a plurality of images of the given real-world scene. Each image of the plurality of images is tagged with the information indicative of date and time at which the image was captured. Notably, when determined values for the plurality of camera attributes for a plurality of orientations of the plurality of cameras are timestamped and stored in the N-dimensional data structure, most recent values for the plurality of camera attributes for the current orientation of the at least one camera can be found from the N-dimensional data structure. When these most recent values are employed to capture the image of the real-world scene from the current orientation of the at least one camera, the captured image is highly likely to appear realistic.

Optionally, when determining the values of the plurality of camera attributes to be employed, the at least one processor is configured to:
 obtain, from the display apparatus, information indicative of a gaze direction of the user;
 identify, based on the gaze direction of the user, an object of interest within the given real-world scene; and
 adjust, based on a plurality of object attributes of the identified object of interest, the values of the plurality of camera attributes for capturing the given image of the given real-world scene from the given orientation of the at least one camera within the environment.

It will be appreciated that the aforesaid adjustment of the values of the plurality of camera attributes based on the gaze direction of the user is performed once the user's gaze becomes stable (namely, fixated along a given direction for a specified time period). This allows for avoiding possible flicker in the captured given image, the flicker being introduced on account of making camera attribute adjustments during rapid movement of the user's gaze.

Optionally, the information indicative of the gaze direction of the user is generated by a means for detecting the gaze direction. Herein, the term "means for detecting the gaze direction" refers to specialized equipment for detecting and/or following a direction of gaze of a user of the display apparatus, when said user views the given real-world scene via the display apparatus. Notably, the gaze direction of the user is detected when the display apparatus, in operation, is worn by the user. Optionally, the means for detecting the gaze direction is implemented by way of contact lenses with sensors, cameras monitoring the position of the pupil of the user's eye, and the like. Such means for detecting the gaze direction are well-known in the art.

Furthermore, the term "object of interest" refers to a given object present within the given real-world scene, towards which the gaze direction of the user is directed (namely, focused). In other words, the object of interest is a fixation object within the given real-world scene. When the gaze direction of the user is directed towards the object of interest, the object of interest is focused onto the fovea of the user's eyes, and is resolved to a much greater detail as compared to the remaining object(s) of the environment.

Optionally, the object of interest is a virtual object that is to be overlaid onto the at least one real object. Alternatively, optionally, the object of interest is a real object.

It will be appreciated that when the image of the given real-world scene is captured in the aforesaid manner, an extent of realism in a representation of the object of interest within said image closely emulates a manner in which the user's eye would perceive the object of interest. In particular, using the plurality of object attributes of the object of interest allows for realistically representing a manner in which said object of interest would appear to the user.

Optionally, when identifying the object of interest, the at least one processor is configured to:
 control the at least one camera to capture an initial image of the given real-world scene;
 analyze the initial image to identify a plurality of pixel segments representative of a plurality of objects present within the given real-world scene; and
 identify, based on the gaze direction of the user, at least one of the plurality of pixel segments at which the user is gazing, wherein the at least one of the plurality of pixel segments represents the object of interest, and wherein the plurality of object attributes comprise pixel values of the at least one of the plurality of pixel segments,
wherein, when adjusting the values of the plurality of camera attributes, the at least one processor is configured to adjust, based on the pixel values of the at least one of the plurality of pixel segments, at least one of: a white balance, an exposure of the at least one camera for capturing the given image of the given real-world scene from the given orientation of the at least one camera within the environment.

In this regard, the initial image of the given real-world scene represents the environment as observed from the given orientation of the at least one camera. Notably, the "initial image" is an image that is captured prior to capturing the given image of the given real-world scene, and is utilized for adjusting the values of the plurality of camera attributes for capturing the given image of the given real-world scene.

Herein, the term "pixel segment" refers to a given group of pixels within the initial image, the given group of pixels having at least one visual attribute in common with each other. Notably, different pixel segments are different from each other in respect of their visual attributes. Examples of the at least visual attribute include, but are not limited to, a color, an intensity, a hue, a texture, a geometry, and a sharpness. It will be appreciated that the initial image comprises the plurality of pixel segments, wherein at least one pixel segment is representative of a given object present within the initial image.

Optionally, the at least one processor employs at least one image segmentation algorithm to identify the plurality of pixel segments. Examples of the at least one image segmentation algorithm include, but are not limited to, a K-means clustering algorithm, an edge detection algorithm, a graph partitioning algorithm, a thresholding algorithm, and a supervised learning neural network-based algorithm. These image segmentation algorithms are well known in the art. Herein, the term "image segmentation" refers to a technique of partitioning the initial image into the plurality of pixel segments based upon visual attributes of pixels within the initial image. Notably, a set of pixels having one or more visual attributes in common is grouped into a single pixel segment.

As an example, given an initial image representative of a meadow environment, the at least one processor may analyze said initial image to identify four pixel segments representative of three objects present within said initial image. The four pixel segments may be different from each other in respect of a color of their constituent pixels and an overall geometry of their constituent pixels. A first pixel segment may comprise pixels having a blue color, a second pixel segment may comprise pixels having a green color, a third pixel segment may comprise pixels having a brown color, and a fourth pixel segment may comprise pixels having a red color. In such an example, the first pixel segment may be representative of sky, the second pixel segment may be representative of grass, the third pixel segment may be representative of walls of a hut within the meadow environment, and the fourth pixel segment may be representative of a roof of the hut. Notably, the first and second pixel segments represent different objects, whereas the third and fourth pixel segments are collectively representative of a single object.

Optionally, the step of analyzing the initial image to identify the plurality of pixel segments is performed whilst taking into account a scene classification of the initial image. Herein, the term "scene classification" refers to a technique in which the initial image is classified into at least one scene category. Scene classification techniques are well known in the art. Notably, the scene classification utilizes at least a relative arrangement of the plurality of objects within the initial image and ambient contextual information of the plurality of objects to classify the initial image. A given scene category pertains to an indoor scene or an outdoor scene. Examples of the at least one scene category include, but are not limited to, a water body scene, a forest scene, a hilly scene, an aerial scene, an indoor scene, and so on.

Optionally, when identifying the at least one of the plurality of pixel segments at which the user is gazing, the at least one processor is configured to:
determine, based on the current gaze direction of the user, a two-dimensional region of interest in the initial image; and
select at least one given pixel segment that overlaps with the two-dimensional region of interest in the initial image as the at least one of the plurality of pixel segments at which the user is gazing.

In this regard, the "two-dimensional region of interest" refers to a region of the initial image whereat the gaze of the user is directed (namely, focused) when the user views the initial image. When the at least one given pixel segment overlaps with the two-dimensional region of interest, the at least one given pixel segment corresponds to the at least one of the plurality of pixel segments at which the user is gazing. The at least one of the plurality of pixel segments at which the user is gazing is representative of the object of interest.

Optionally, a size and/or shape of the object of interest is determined based upon a shape and/or size of the at least one of the plurality of pixel segments at which the user is gazing. Notably, the size and/or shape of said at least one of the plurality of pixel segments corresponds to the shape and/or size of the object of interest. An overall geometry of the at least one of the plurality of pixel segments at which the user is gazing defines the size and/or shape of the object of interest.

Optionally, the plurality of object attributes comprise the pixel values of the at least one of the plurality of pixel segments. Throughout the present disclosure, the term "pixel value" of a given pixel segment refers to a measured value of the at least one visual attribute which is common to all pixels of the given pixel segment. Notably, the pixel values of the at least one of the plurality of pixel segments are indicative of the plurality of object attributes of the object of interest. In particular, since the object of interest is represented by the at least one of the plurality of pixel segments, the plurality of object attributes of the object of interest correspond to the pixel values of the at least one of the plurality of pixel segments.

As an example, for the initial image, ten pixel segments may be identified, said ten pixel segments being representative of four objects present within the initial image. Amongst these ten pixel segments, two pixel segments may be representative of an object of interest, for example, such as a tree. Notably, pixel values of a first pixel segment among said two pixel segments may indicate that pixels of the first pixel segment have a brown color, and a wooden texture. Likewise, pixel values of a second pixel segment among said two pixel segments may indicate that pixels of the second pixel segment have a green color, and a leafy texture. Therefore, in such an example, objects attributes of said object of interest may comprise the pixel values of the first and second pixel segments. For example, a first object attribute of said object of interest may be that the object of interest has two colors: brown and green, and a second object attribute of the object of interest may be that the object of interest has two textures: wooden and leafy.

Optionally, when adjusting the values of the plurality of camera attributes, the at least one processor is configured to adjust at least one of: the white balance, the exposure of the at least one camera for capturing the given image of the given real-world scene. Notably, a human visual system would differently perceive the plurality of object attributes of the object of interest under different imaging conditions. Therefore, adjusting the white balance and/or the exposure of the at least one camera based on the pixel values of the at least one of the plurality of pixel segments allows the given image to emulate a manner in which the human visual system would perceive the object attributes of the object of interest.

Optionally, the at least one processor is configured to adjust the white balance of the at least one camera by adjusting a color temperature at which the image is to be captured. Optionally, the color temperature at which the image is to be captured lies within a predefined range of color temperatures associated with the at least one camera, wherein the predefined range of color temperatures ranges from 1000 Kelvin to 10000 Kelvin. As an example, when the object of interest is a real object such as a beach having object attributes of white color and grainy texture, the white balance of the at least one camera may be adjusted to capture the initial image at a color temperature of 5200 Kelvin.

Optionally, the at least one processor is configured to adjust the exposure of the at least one camera by adjusting at least one of: an aperture, a shutter speed, a sensitivity with which the given image is to be captured.

Optionally, the at least one processor is configured to adjust the aperture of the at least one camera by adjusting a f/stop value of the at least one camera. A low f/stop value (for example, such as f/1.4) corresponds to a large aperture, whereas a high f/stop value (for example, such as f/8) corresponds to a small aperture. The large aperture provides more exposure as compared to the small aperture.

Optionally, the at least one processor is configured to adjust the shutter speed by increasing or decreasing the shutter speed. A fast shutter speed (for example, such as ¹⁄₂₅₀ seconds) provides lower exposure as compared to a slow shutter speed (for example, such as ½ seconds). Moreover, the fast shutter speed corresponds to a low exposure time, whereas the slow shutter speed corresponds to a high exposure time.

Optionally, the at least one processor is configured to adjust the sensitivity of the at least one camera by adjusting a maximum sensitivity threshold and/or a minimum sensitivity threshold at which the image of the real-world scene is to be captured. As an example, when the object of interest is a real object such as a notebook having an object attribute of a dark blue color, in order to increase the exposure, the maximum sensitivity threshold of the at least one camera may be increased from a lower value to a higher value, without changing the aperture and the shutter speed, for capturing the image of the real-world scene comprising said object of interest.

Optionally, the imaging system further comprising means for generating a depth or voxel map of the given real-world scene, wherein, when determining the values of the plurality of camera attributes to be employed, the at least one processor is configured to determine, based on the generated depth or voxel map, an optical depth of the object of interest within the given real-world scene, wherein the plurality of object attributes comprise the optical depth of the object of interest, wherein, when adjusting the values of the plurality of camera attributes, the at least one processor is configured to adjust, based on the optical depth of the object of interest, a focus length of the at least one camera for capturing the given image of the given real-world scene from the given orientation of the at least one camera within the environment.

Optionally, the depth map or the voxel map is generated when the N-dimensional data structure is implemented as the three-dimensional data structure.

Throughout the present disclosure, the term "means for generating the depth or the voxel map" refers to equipment and/or techniques configured to record and represent optical depth (namely, optical distance) of the at least one real object within the given real-world scene. Said means provides a frame of reference from which the optical depth of the at least one real object can be extracted.

Optionally, the means for generating the depth map or the voxel map comprises an imaging device configured to capture a depth image (namely, an image depicting depth) of the given real-world scene to generate the depth map or the voxel map of the given real-world scene. Additionally, optionally, the means for generating the depth map or the voxel map comprises a processing module coupled to the imaging device, wherein the processing module is configured to process the captured depth image for generating the depth map or the voxel map of the given real-world scene. Optionally, the depth image is a two-dimensional image or a three-dimensional image. It will be appreciated that the imaging device could be a two-dimensional camera or a depth camera.

Throughout the present disclosure, the term "depth map" relates to a data structure comprising information pertaining to the optical depth of the at least one real object within the given real-world scene.

Optionally, the depth map is an image comprising a plurality of pixels, wherein a colour of each pixel indicates optical depth of its corresponding real point within the given real-world scene.

Furthermore, throughout the present disclosure, the term "voxel map" used herein relates to a data structure comprising a plurality of three-dimensional volume elements that constitute the given real-world scene, wherein each three-dimensional volume element represents a three-dimensional region within the given real-world scene. A given three-dimensional volume element is indicative of the optical depth of its corresponding region within the given real-world scene.

Optionally, the at least one processor determines the optical depth of the object of interest within the given real-world scene by mapping a current gaze direction of the user to the depth or voxel map. In this way, the at least one processor associates the current gaze direction of the user with the depth or the voxel map to determine those data structure elements of the depth or the voxel map that substantially correspond to the object of interest. Thereafter, the at least one processor extracts optical depth information associated with such data structure elements to determine the optical depth of the object of interest.

It will be appreciated that determining the optical depth of the object of interest is especially useful when the object of interest is a real object. When the object of interest is a virtual object, the optical depth of the object of interest is known since said virtual object is added at a known optical depth by the at least one processor. Moreover, adjusting the values of the plurality of camera attributes to be employed, based on the optical depth of the object of interest is useful for realistically representing visual detail pertaining to depth of the object of interest, in the given image.

Optionally, when adjusting the plurality of camera attributes of the at least one camera, the at least one processor is configured to adjust the focus length of the at least one camera according to the optical depth of the object of interest for capturing the given image of the given real-world scene. In this regard, by adjusting the focus length of the at least one camera according to the optical depth of the object of interest, the at least one processor controls the at least one camera to focus sharply within the given real-world scene at the optical depth of the object of interest. This allows for the object of interest to appear as sharp as possible within the given image. It will be appreciated that targeting focus of the at least one camera in the aforesaid manner only requires knowledge of (i) the current gaze direction of the user for determining the object of interest, and (ii) the optical depth of the object of interest.

Optionally, when the focus length of the at least one camera is adjusted according to the optical depth of the object of interest, a region of the given real-world scene that lies within a depth of field of said optical depth appears acceptably sharp within the given image of the given real-world scene. Moreover, optionally, the at least one processor is configured to implement a blur effect for regions of the given real-world scene that lie outside the depth of field of said optical depth, when generating the image of the real-world scene. Herein, the term "blur effect" (namely, bokeh) relates to an aesthetic unfocus (namely, blurring, softness, or lack of clarity) associated with the regions of the given real-world scene that lie outside the depth of field of the optical depth of the object of interest. Upon implementation of said blur effect, a sharpness of the at least one object lying outside the region of interest is lower as compared to a sharpness of the object of interest lying in the region of interest.

Optionally, when determining the values of the plurality of camera attributes to be employed, the at least one processor is configured to:

detect changes occurring in the gaze direction of the user during a given time period; and determine, based on the changes occurring in the gaze direction of the user during the given time period, a velocity of the object of interest, wherein the plurality of object attributes comprise the velocity of the object of interest, wherein, when adjusting the values of the plurality of camera attributes, the at least one processor is configured to adjust, based on the velocity of the object of interest, at least one of: an exposure time, a sensitivity, an aperture of the at least one camera for capturing the given image of the given real-world scene from the given orientation of the at least one camera within the environment.

In this regard, within the given time period, the user's gaze direction may change from a first set of pixel segment(s) to a second set of pixel segment(s) within the initial image. Optionally, said change in gaze direction corresponds to a movement of the object of interest within the given real-world scene. As the object of interest moves from a first location to a second location within the given real-world scene, the user's gaze direction follows said movement, and said gaze direction changes from the first set of pixel segment(s) to the second set of pixel segment(s). A velocity of the user's gaze direction is calculated as a rate of change occurring in the gaze direction of the user within the given time period. The velocity of the user's gaze direction corresponds to the velocity of the object of interest. The velocity of the object of interest within the given real-world scene is the velocity with which the object of interest is moving within the given real-world scene.

Optionally, adjusting the plurality of camera attributes of the at least one camera according to the velocity of the object of interest allows for providing an accurate optical flow for the object of interest within the given image of the given real-world scene to be presented to the user. Notably, adjusting at least one of the aforesaid camera attributes allows for emulating a manner in which the human visual system perceives the movement of the object of interest. Moreover, an extent of such adjustment is to be selected according to the velocity of the object of interest in order to realistically and accurately emulate said movement perception of the human visual system. Such an adjustment is made in order to avoid any of the plurality of object attributes of the object of interest in motion from getting motion blurred beyond recognition. Such undesirable motion blurring would considerably diminish user's experience of viewing the given image.

As an example, the exposure time of the at least one camera may be adjusted in a manner that the movement of the object of interest within the exposure time remains relatively small as compared to a movement of other object (s) within the given image. Such a manner of adjusting (for example, by reducing) the exposure time allows for maintaining decipherability of the object of interest whilst also representing, to a required extent, the movement of the object of interest within the given image. The exposure time may, for example, be adjusted by adjusting the shutter speed of the at least one camera. A higher shutter speed corresponds to a low exposure time, and vice versa.

Moreover, optionally, when adjusting the plurality of camera attributes of the at least one camera, the at least one processor is configured to adjust at least one of: the shutter speed, the sensitivity, the aperture of the at least one camera according to a brightness of the object of interest for capturing the given image of the given real-world scene. This enables the at least one processor to adjust a brightness of the given image in a manner that the object of interest appears sufficiently dark or bright, as required, in respect of the given image. Moreover, this allows for emulating a manner in which the human visual system would perceive the brightness of the object of interest within the given real-world scene.

Optionally, the plurality of camera attributes of the at least one camera are adjusted in a manner that a brightness of all pixels of the two-dimensional region of interest in the initial image lies within a dynamic range of the at least one camera. As an example, when the object of interest is considerably brighter than remaining object(s) present within the initial image, the shutter speed, the sensitivity, and the aperture of the at least one camera are adjusted to capture the given image in a manner that the brightness of the object of interest is limited to ensure that the object of interest is not overexposed and not inconspicuous.

Optionally, when adjusting the exposure time of the at least one camera, the at least one processor is configured to employ a High-Dynamic-Range (HDR) bracketing technique. Optionally, in the HDR bracketing technique, the at least one camera is configured to employ a plurality of exposure times for capturing a plurality of images of the given real-world scene, and the at least one camera or the at least one processor is configured to combine the plurality of images of the given real-world scene to form the given image of the given real-world scene. In the resultant given image of the given real-world scene, a representation of a given real object is selected as required, from amongst the different representations of the given real object within the plurality of images.

The present disclosure also relates to the method as described above. Various embodiments and variants disclosed above apply mutatis mutandis to the method.

Optionally, in the method, the step of determining the values of the plurality of camera attributes to be employed comprises determining, for a plurality of positions and orientations of the at least one camera within the environment, values of a plurality of camera attributes to be employed to capture a given image of the given real-world scene from a given position and orientation of the at least one camera within the environment and updating the N-dimensional data structure with the determined values of the plurality of camera attributes for the given position and orientation of the at least one camera within the environment, the step of accessing the N-dimensional data structure comprises finding values of the plurality of camera attributes for a current position and orientation of the at least one camera within the environment, and the step of controlling the at least one camera comprises employing the found values of the plurality of camera attributes for capturing an image of the real-world scene from the current position and orientation of the at least one camera within the environment.

Optionally, the method further comprises generating from the captured image a mixed-reality image to be presented to the user via the display apparatus, the mixed-reality image being representative of at least one virtual object that is overlaid onto at least one real object present within the given real-world scene, wherein the step of determining the values of the plurality of camera attributes to be employed comprises adjusting, based on a state of the at least one virtual object in the mixed-reality image, the values of the plurality of camera attributes for capturing the given image of the given real-world scene from the given orientation of the at least one camera within the environment.

Optionally, in the method, the step of updating the N-dimensional data structure comprises storing the determined values of the plurality of camera attributes for the given orientation of the at least one camera within the environment along with information indicative of a state of the environment when the given image was captured, wherein the method further comprises taking into consideration a current state of the environment whilst employing the found values of the plurality of camera attributes for capturing the image of the real-world scene from the current orientation of the at least one camera within the environment.

Optionally, in the method, the step of updating the N-dimensional data structure comprises storing the determined values of the plurality of camera attributes for the given orientation of the at least one camera within the environment along with information indicative of a date and time at which the given image was captured.

Optionally, in the method, the step of determining the values of the plurality of camera attributes to be employed comprises:
obtaining, from the display apparatus, information indicative of a gaze direction of the user;
identifying, based on the gaze direction of the user, an object of interest within the given real-world scene; and
adjusting, based on a plurality of object attributes of the identified object of interest, the values of the plurality of camera attributes for capturing the given image of the given real-world scene from the given orientation of the at least one camera within the environment.

Optionally, in the method, the step of identifying the object of interest comprises:
controlling the at least one camera to capture an initial image of the given real-world scene;
analyzing the initial image to identify a plurality of pixel segments representative of a plurality of objects present within the given real-world scene; and
identifying, based on the gaze direction of the user, at least one of the plurality of pixel segments at which the user is gazing, wherein the at least one of the plurality of pixel segments represents the object of interest, and wherein the plurality of object attributes comprise pixel values of the at least one of the plurality of pixel segments,
wherein the step of adjusting the values of the plurality of camera attributes comprises adjusting, based on the pixel values of the at least one of the plurality of pixel segments, at least one of: a white balance, an exposure of the at least one camera for capturing the given image of the given real-world scene from the given orientation of the at least one camera within the environment.

Optionally, the method further comprises generating a depth or voxel map of the given real-world scene,
wherein the step of determining the values of the plurality of camera attributes to be employed comprises determining, based on the generated depth or voxel map, an optical depth of the object of interest within the given real-world scene, wherein the plurality of object attributes comprise the optical depth of the object of interest,
wherein the step of adjusting the values of the plurality of camera attributes comprises adjusting, based on the optical depth of the object of interest, a focus length of the at least one camera for capturing the given image of the given real-world scene from the given orientation of the at least one camera within the environment.

Optionally, in the method, the step of determining the values of the plurality of camera attributes to be employed comprises:
detecting changes occurring in the gaze direction of the user during a given time period; and
determining, based on the changes occurring in the gaze direction of the user during the given time period, a velocity of the object of interest, wherein the plurality of object attributes comprise the velocity of the object of interest,
wherein the step of adjusting the values of the plurality of camera attributes comprises adjusting, based on the velocity of the object of interest, at least one of: an exposure time, a sensitivity, an aperture of the at least one camera for capturing the given image of the given real-world scene from the given orientation of the at least one camera within the environment.

DETAILED DESCRIPTION OF THE DRAWINGS

Figure 1:
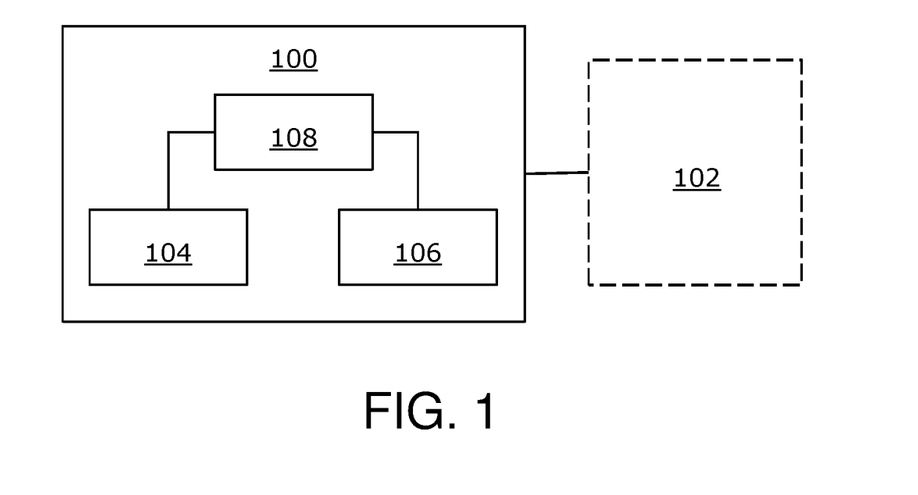
FIGS. 1 and 2 illustrate block diagrams of architectures of an imaging system for producing images for a display apparatus, in accordance with different embodiments of the present disclosure.

Referring to FIG. 1, illustrated is a block diagram of architecture of an imaging system 100 for producing images for a display apparatus 102, in accordance with an embodiment of the present disclosure. The imaging system 100 comprises at least one camera (depicted as a camera 104), means 106 for tracking an orientation of the camera 104, and at least one processor (depicted as a processor 108) communicably coupled to the camera 104 and said means 106.

The processor 108 is configured to:
create and store an N-dimensional data structure representative of an environment to be presented to a user;
for a plurality of orientations of the camera 104 within the environment, determine values of a plurality of camera attributes to be employed to capture a given image of a given real-world scene from a given orientation of the camera 104 within the environment and update the N-dimensional data structure with the determined values of the plurality of camera attributes for the given orientation of the camera 104 within the environment;
access the N-dimensional data structure to find values of the plurality of camera attributes for a current orientation of the camera 104 within the environment; and
control the camera 104 to employ the found values of the plurality of camera attributes for capturing an image of a real-world scene from the current orientation of the camera 104 within the environment.

Figure 2:
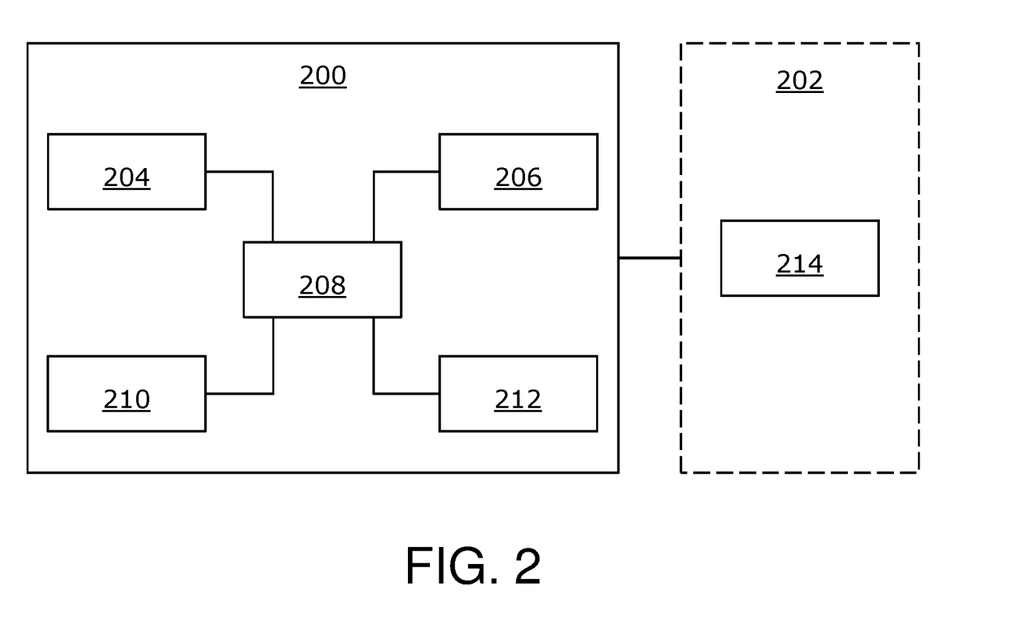

Referring to FIG. 2, illustrated is a block diagram of architecture of an imaging system 200 for producing images for a display apparatus 202, in accordance with another embodiment of the present disclosure. The imaging system 200 comprises at least one camera (depicted as a camera 204), means 206 for tracking an orientation of the camera 204, and at least one processor (depicted as a processor 208) communicably coupled to the camera 204 and said means 206. The imaging system 200 further comprises means 210 for tracking a position of the camera 204, said means 210 being communicably coupled to the processor 208. The imaging system 200 further comprises a means 212 for generating a depth or voxel map of a given real-world scene. Said means 212 is shown to be communicably coupled to the processor 208.

Moreover, the display apparatus 202 comprises a means 214 for detecting gaze direction of a user. The means 214 for detecting gaze direction is configured to generate information indicative of the gaze direction of the user.

It may be understood by a person skilled in the art that FIG. 1 and FIG. 2 include simplified architectures of the imaging systems 100 and 200, respectively, for sake of clarity, which should not unduly limit the scope of the claims herein. The person skilled in the art will recognize many variations, alternatives, and modifications of embodiments of the present disclosure.

Figure 3:
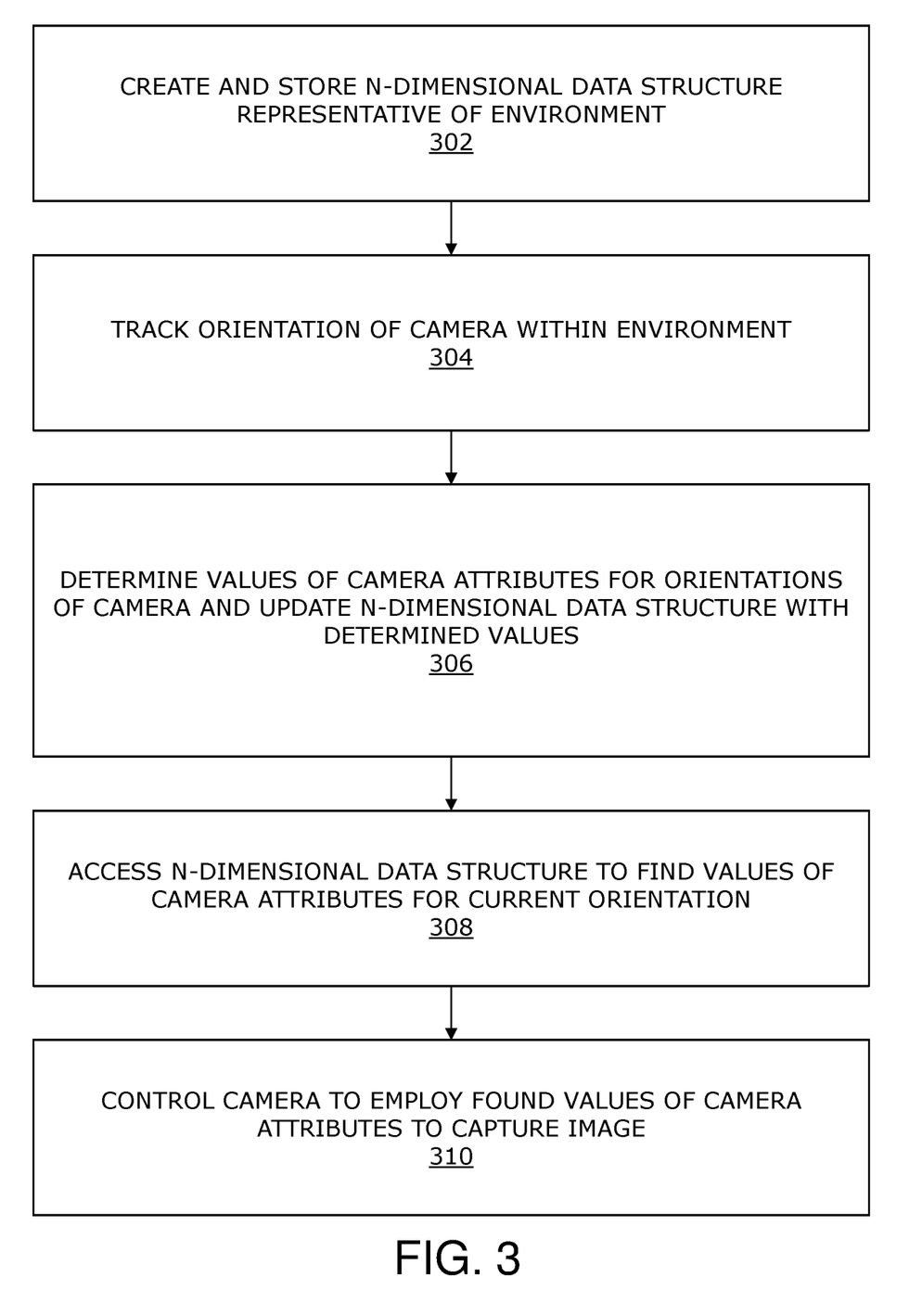
FIG. 3 illustrates steps of a method of producing images for a display apparatus, in accordance with an embodiment of the present disclosure.

Referring to FIG. 3, illustrated are steps of a method of producing images for a display apparatus, in accordance with an embodiment of the present disclosure. At step 302, an N-dimensional data structure is created and stored. The N-dimensional data structure is representative of an environment to be presented to a user. At step 304, an orientation of at least one camera within the environment is tracked. At step 306, for a plurality of orientations of the at least one camera within the environment, values of a plurality of camera attributes to be employed to capture a given image of a given real-world scene from a given orientation of the at least one camera within the environment are determined, and the N-dimensional data structure is updated with the determined values of the plurality of camera attributes for the given orientation of the at least one camera within the environment. At step 308, the N-dimensional data structure is accessed to find values of the plurality of camera attributes for a current orientation of the at least one camera within the environment. At step 310, the at least one camera is controlled to employ the found values of the plurality of camera attributes for capturing an image of a real-world scene from the current orientation of the at least one camera within the environment.

The steps 302 to 310 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An imaging system for producing images for a display apparatus, the imaging system comprising:
   at least one camera;
   means for tracking an orientation of the at least one camera; and
   at least one processor communicably coupled to the at least one camera and said means, wherein the at least one processor is configured to:
      create and store an N-dimensional data structure representative of an environment to be presented to a user for a plurality of orientations of the at least one camera within the environment;
      determine values of a plurality of camera attributes comprising at least one of an exposure, an exposure time, a white balance, a focus length, a shutter speed, a sensitivity, or an aperture, to be employed to capture a given image of a given real-world scene from a given orientation of the at least one camera within the environment;
      update the N-dimensional data structure with the determined values of the plurality of camera attributes for the given orientation of the at least one camera within the environment;
      access the N-dimensional data structure to find values of the plurality of camera attributes for a current orientation of the at least one camera within the environment; and
      control the at least one camera to employ the found values of the plurality of camera attributes for capturing an image of a real-world scene from the current orientation of the at least one camera within the environment.

2. The imaging system of claim 1, further comprising means for tracking a position of the at least one camera, said means being communicably coupled to the at least one processor, wherein, when determining the values of the plurality of camera attributes to be employed, the at least one processor is configured to determine, for a plurality of positions and orientations of the at least one camera within the environment, values of a plurality of camera attributes to be employed to capture a given image of the given real-world scene from a given position and orientation of the at least one camera within the environment and update the N-dimensional data structure with the determined values of the plurality of camera attributes for the given position and orientation of the at least one camera within the environment,
   wherein, when accessing the N-dimensional data structure, the at least one processor is configured to find values of the plurality of camera attributes for a current position and orientation of the at least one camera within the environment, and
   wherein, when controlling the at least one camera, the at least one processor is configured to employ the found values of the plurality of camera attributes for capturing an image of the real-world scene from the current position and orientation of the at least one camera within the environment.

3. The imaging system of claim 1, wherein the at least one processor is configured to generate from the captured image a mixed-reality image to be presented to the user via the display apparatus, the mixed-reality image being representative of at least one virtual object that is overlaid onto at least one real object present within the given real-world scene,
   wherein, when determining the values of the plurality of camera attributes to be employed, the at least one processor is configured to adjust, based on a state of the at least one virtual object in the mixed-reality image, the values of the plurality of camera attributes for capturing the given image of the given real-world scene from the given orientation of the at least one camera within the environment.

4. The imaging system of claim 1, wherein, when updating the N-dimensional data structure, the at least one processor is configured to store the determined values of the plurality of camera attributes for the given orientation of the at least one camera within the environment along with information indicative of a state of the environment when the given image was captured, wherein the at least one processor is configured to take into consideration a current state of the environment whilst employing the found values of the plurality of camera attributes for capturing the image of the real-world scene from the current orientation of the at least one camera within the environment.

5. The imaging system of claim 1, wherein, when updating the N-dimensional data structure, the at least one processor is configured to store the determined values of the plurality of camera attributes for the given orientation of the at least one camera within the environment along with information indicative of a date and time at which the given image was captured.

6. The imaging system of claim 1, wherein, when determining the values of the plurality of camera attributes to be employed, the at least one processor is configured to:
   obtain, from the display apparatus, information indicative of a gaze direction of the user;
   identify, based on the gaze direction of the user, an object of interest within the given real-world scene; and
   adjust, based on a plurality of object attributes of the identified object of interest, the values of the plurality of camera attributes for capturing the given image of the given real-world scene from the given orientation of the at least one camera within the environment.

7. The imaging system of claim 6, wherein, when identifying the object of interest, the at least one processor is configured to:
   control the at least one camera to capture an initial image of the given real-world scene;
   analyze the initial image to identify a plurality of pixel segments representative of a plurality of objects present within the given real-world scene; and
   identify, based on the gaze direction of the user, at least one of the plurality of pixel segments at which the user is gazing, wherein the at least one of the plurality of pixel segments represents the object of interest, and wherein the plurality of object attributes comprise pixel values of the at least one of the plurality of pixel segments,
   wherein, when adjusting the values of the plurality of camera attributes, the at least one processor is configured to adjust, based on the pixel values of the at least one of the plurality of pixel segments, at least one of: the white balance, the exposure of the at least one camera for capturing the given image of the given real-world scene from the given orientation of the at least one camera within the environment.

8. The imaging system of claim 6, further comprising means for generating a depth or voxel map of the given real-world scene, wherein, when determining the values of the plurality of camera attributes to be employed, the at least one processor is configured to determine, based on the generated depth or voxel map, an optical depth of the object of interest within the given real-world scene, wherein the plurality of object attributes comprise the optical depth of the object of interest,
   wherein, when adjusting the values of the plurality of camera attributes, the at least one processor is configured to adjust, based on the optical depth of the object of interest, the focus length of the at least one camera for capturing the given image of the given real-world scene from the given orientation of the at least one camera within the environment.

9. The imaging system of claim 6, wherein, when determining the values of the plurality of camera attributes to be employed, the at least one processor is configured to:
   detect changes occurring in the gaze direction of the user during a given time period; and
   determine, based on the changes occurring in the gaze direction of the user during the given time period, a velocity of the object of interest, wherein the plurality of object attributes comprise the velocity of the object of interest,
   wherein, when adjusting the values of the plurality of camera attributes, the at least one processor is configured to adjust, based on the velocity of the object of interest, at least one of: the exposure time, the sensitivity, the aperture of the at least one camera for capturing the given image of the given real-world scene from the given orientation of the at least one camera within the environment.

10. A method of producing images for a display apparatus, the method comprising:
    creating and storing an N-dimensional data structure representative of an environment to be presented to a user for a plurality of orientations of the at least one camera within the environment;
    tracking an orientation of at least one camera within the environment;
    determining values of a plurality of camera attributes comprising at least one of an exposure, an exposure time, a white balance, a focus length, a shutter speed, a sensitivity, or an aperture, to be employed to capture a given image of a given real-world scene from a given orientation of the at least one camera within the environment;
    updating the N-dimensional data structure with the determined values of the plurality of camera attributes for the given orientation of the at least one camera within the environment;
    accessing the N-dimensional data structure to find values of the plurality of camera attributes for a current orientation of the at least one camera within the environment; and
    controlling the at least one camera to employ the found values of the plurality of camera attributes for capturing an image of a real-world scene from the current orientation of the at least one camera within the environment.

11. The method of claim 10, wherein the step of determining the values of the plurality of camera attributes to be employed comprises determining, for a plurality of positions and orientations of the at least one camera within the environment, values of a plurality of camera attributes to be employed to capture a given image of the given real-world scene from a given position and orientation of the at least one camera within the environment and updating the N-dimensional data structure with the determined values of the plurality of camera attributes for the given position and orientation of the at least one camera within the environment,
    the step of accessing the N-dimensional data structure comprises finding values of the plurality of camera attributes for a current position and orientation of the at least one camera within the environment, and
    the step of controlling the at least one camera comprises employing the found values of the plurality of camera attributes for capturing an image of the real-world scene from the current position and orientation of the at least one camera within the environment.

12. The method of claim 10, further comprising generating from the captured image a mixed-reality image to be presented to the user via the display apparatus, the mixed-reality image being representative of at least one virtual object that is overlaid onto at least one real object present within the given real-world scene, wherein the step of determining the values of the plurality of camera attributes to be employed comprises adjusting, based on a state of the at least one virtual object in the mixed-reality image, the values of the plurality of camera attributes for capturing the given image of the given real-world scene from the given orientation of the at least one camera within the environment.

13. The method of claim 10, wherein the step of updating the N-dimensional data structure comprises storing the determined values of the plurality of camera attributes for the given orientation of the at least one camera within the environment along with information indicative of a state of the environment when the given image was captured, wherein the method further comprises taking into consideration a current state of the environment whilst employing the found values of the plurality of camera attributes for capturing the image of the real-world scene from the current orientation of the at least one camera within the environment.

14. The method of claim 10, wherein the step of updating the N-dimensional data structure comprises storing the determined values of the plurality of camera attributes for the given orientation of the at least one camera within the environment along with information indicative of a date and time at which the given image was captured.

15. The method of claim 10, wherein the step of determining the values of the plurality of camera attributes to be employed comprises:

obtaining, from the display apparatus, information indicative of a gaze direction of the user;

identifying, based on the gaze direction of the user, an object of interest within the given real-world scene; and adjusting, based on a plurality of object attributes of the identified object of interest, the values of the plurality of camera attributes for capturing the given image of the given real-world scene from the given orientation of the at least one camera within the environment.

16. The method of claim 15, wherein the step of identifying the object of interest comprises:

controlling the at least one camera to capture an initial image of the given real-world scene;

analyzing the initial image to identify a plurality of pixel segments representative of a plurality of objects present within the given real-world scene; and identifying, based on the gaze direction of the user, at least one of the plurality of pixel segments at which the user is gazing, wherein the at least one of the plurality of pixel segments represents the object of interest, and wherein the plurality of object attributes comprise pixel values of the at least one of the plurality of pixel segments, wherein the step of adjusting the values of the plurality of camera attributes comprises adjusting, based on the pixel values of the at least one of the plurality of pixel segments, at least one of: the white balance, the exposure of the at least one camera for capturing the given image of the given real-world scene from the given orientation of the at least one camera within the environment.

17. The method of claim 15, further comprising generating a depth or voxel map of the given real-world scene, wherein the step of determining the values of the plurality of camera attributes to be employed comprises determining, based on the generated depth or voxel map, an optical depth of the object of interest within the given real-world scene, wherein the plurality of object attributes comprise the optical depth of the object of interest, wherein the step of adjusting the values of the plurality of camera attributes comprises adjusting, based on the optical depth of the object of interest, the focus length of the at least one camera for capturing the given image of the given real-world scene from the given orientation of the at least one camera within the environment.

18. The method of claim 15, wherein the step of determining the values of the plurality of camera attributes to be employed comprises:

detecting changes occurring in the gaze direction of the user during a given time period; and determining, based on the changes occurring in the gaze direction of the user during the given time period, a velocity of the object of interest, wherein the plurality of object attributes comprise the velocity of the object of interest, wherein the step of adjusting the values of the plurality of camera attributes comprises adjusting, based on the velocity of the object of interest, at least one of: the exposure time, the sensitivity, the aperture of the at least one camera for capturing the given image of the given real-world scene from the given orientation of the at least one camera within the environment.

* * * * *